United States Patent [19]

Kuo et al.

[11] Patent Number: 4,939,019

[45] Date of Patent: Jul. 3, 1990

[54] COMPOSITIONS AND PROCESS FOR PRODUCING FOAM PLASTICS

[75] Inventors: Ching-Chi Kuo, Pleasanton; Mark Robertson, Fremont; Kyu W. Lee, Danville, all of Calif.

[73] Assignee: Hexcel Corporation, Dublin, Calif.

[21] Appl. No.: 436,834

[22] Filed: Nov. 15, 1989

Related U.S. Application Data

[62] Division of Ser. No. 243,383, Sep. 12, 1988.

[51] Int. Cl.$^5$ .......................... B32B 9/00; B32B 3/26; B32B 27/00
[52] U.S. Cl. .............................. 428/318.4; 428/319.1; 428/319.3; 428/316.6; 521/82; 521/94; 521/95; 521/149; 521/128; 526/300
[58] Field of Search .............. 428/318.4, 319.1, 319.3, 428/316.6; 521/82, 94, 95, 149, 128; 526/300

[56] References Cited

U.S. PATENT DOCUMENTS

| | | | |
|---|---|---|---|
| 3,513,112 | 5/1970 | Kamai et al. | 521/149 |
| 3,553,160 | 1/1971 | Schroeder et al. | 526/240 |
| 3,708,444 | 1/1973 | Ganzler et al. | 521/149 |
| 3,760,047 | 9/1973 | Gaeth et al. | 521/149 |
| 4,139,685 | 2/1979 | Schroeder | 521/149 |
| 4,187,353 | 2/1980 | Schroeder | 521/149 |
| 4,576,971 | 3/1986 | Baumgartner et al. | 521/149 |

*Primary Examiner*—Morton Foelak
*Attorney, Agent, or Firm*—Townsend and Townsend

[57] ABSTRACT

Plastic foam materials having a high degree of structural integrity, cell network uniformity and small cell size are obtained from (meth)acrylic acid and (meth)acrylonitrile by incorporating acrylamide as a comonomer additive within certain ranges of concentration. Incorporation of the latter together with conventional additives normally used in preparing foams from the principal monomers helps to avoid preliminary precipitation during the polymerization process, and the gradients in the polymer microstructure which frequently result and cause internal stresses and weaknesses in the ultimate product.

7 Claims, No Drawings

COMPOSITIONS AND PROCESS FOR PRODUCING FOAM PLASTICS

This is a division of application Ser. No. 07/243,383 filed Sept. 12, 1988.

This invention relates to foamed plastics based on copolymers of acrylic or methacrylic acid and acrylo- or methacrylonitrile.

BACKGROUND OF THE INVENTION

Foam plastics are known for their utility as lightweight yet strong materials that are environmentally stable. During production, the materials can be molded into essentially any shape, and thereby offer a wide range of utility, extending from construction and packaging materials to high performance materials for thermal insulation and impact resistance.

The polymerization and foaming are generally performed as two separate steps, enabling one to prepare the material ready for foaming in a manner which is convenient and economical for shipping and storage purposes. Foaming may then be done at the site of manufacture of the finished product, and may be tailored to any specific size or shape that the user requires.

To maintain product integrity and maximize the performance characteristics of the finished foam, a prefoam is needed which will foam uniformly into a product capable of withstanding the mechanical stresses to be encountered during use. Structural integrity requires a uniform continuous cell structure within the foam, and optimum foams will be those having cells small in size and with a narrow size range. Wide variations in cell size and internal stresses in the overall cell structure render the foamed product vulnerable to rupture and the consequent loss of strength. In some foamable polymers, notably those produced by the copolymerization of (meth)acrylic acid and (meth)acrylonitrile, indications of faulty products are evident in the early stages of polymerization as well as by a close inspection of the microstructure of the product. Premature precipitation, for example, in the liquid reaction mixture during polymerization frequently serves as an indication that non-homogeneities will result. While the reason for the precipitation is not understood it produces gradients in the microstructure as polymerization proceeds, resulting in pre-foams containing regions of non-homogeneity. Non-homogeneities are frequently evident due to their tendency to form undulations on the surface of a pre-foam piece rather than producing a piece with a completely flat surface. Non-homogeneous pre-foams are undesirable since they give rise to localized internal stresses upon foaming. which lead to weaknesses in the final structure and ultimately to rupture.

A number of disclosures in the patent literature present attempts to solve these problems. Schroeder et al., U.S. Pat. No. 3,627,711, addresses foams prepared from acrylamide or methacrylamide resins. The disclosure maintains that the inclusion of formamide as a foaming agent will prevent premature precipitation during the polymerization stage. The amount of formamide which can be used, however, limits the density range which can be achieved in the final product. Buchholz et al., U.S. Pat. No. 3,468,820, addresses foam plastics prepared from styrene polymers. The focus of this disclosure is the inclusion of a small amount of a polymer of which certain types are specified, to achieve control over cell size and uniformity upon foaming. Kanai et al., U.S. Pat. No. 3,489,700, discloses the improvement in water resistance obtained by copolymerizing acrylamide with acrylic acid esters. Unfortunately, the prefoam produced by this polymerization is rigid and susceptible to rupture upon expansion. Schroeder et al., U.S. Pat. No. 3,734,870 addresses foamed plastics formed from copolymers of (meth)acrylic acid and its amide or nitrile. The patent states that homogeneous copolymerization can be achieved by the inclusion of vinyl copolymers, silica gel or asbestos flour. Nevertheless, the polymerization is not truly homogeneous.

SUMMARY OF THE INVENTION

It has now been discovered that copolymers of (meth)acrylic acid and (meth)acrylonitrile of a truly homogeneous character and fine cell structure, as well as excellent mechanical properties and moisture resistance can be achieved by the inclusion of a controlled amount of acrylamide as a copolymerization additive. The acrylamide prevents premature precipitation during the polymerization process as well as the formation of products having a fibrous structure susceptible to mechanical failure. While certain foaming agents and foaming aids are known to be effective in preventing premature precipitation, acrylamide, unlike these substances, does so without increasing the foaming, and thus avoids the risk of excessive expansion and ultimate rupture that too much foaming can raise.

In addition, the product formed by using acrylamide has the advantage of a higher glass transition temperature than foams of the prior art. The acrylamide is used in combination with other additives commonly used in the copolymerization of (meth)acrylic acid and (meth)acrylonitrile. Likewise, polymerization and foaming conditions known to be effective for the latter are applicable here as well.

DETAILED DESCRIPTION OF THE INVENTION AND PREFERRED EMBODIMENTS

The amount of acrylamide incorporated as an additive in accordance with the present invention will be limited to certain ranges in order to achieve the desired effects. In addition to the avoidance of precipitation and the achievement of a uniform distribution of small diameter cells in the final product, it is also desirable to retain flexibility, thermal expansion capabilities, and better moisture resistance. With these considerations in mind, the acrylamide is present in an amount ranging from about 5 to about 20 parts by weight, based on 100 parts by weight of the combination of the two principal monomers—acrylic acid or methacrylic acid on the one hand, and acrylonitrile or methacrylonitrile on the other. In preferred embodiments, the acrylamide is present in an amount ranging from about 10 to about 20 parts by weight per 100 parts by weight of the combined principal monomers. At significantly higher concentrations of acrylamide, such as greater than 30 parts by weight, a significant loss of moisture resistance properties is experienced. It will be understood among those skilled in the art that amounts outside these ranges may produce equivalent results in certain systems, and are likewise contemplated as within the general scope of the invention.

As for the principal monomers themselves, the (meth)acrylic acid is generally used in a greater amount (on a weight basis) than the (meth)acrylonitrile. In preferred embodiments, the two are present in a weight ratio ranging from about 1.5 to about 4.0.

In accordance with the known technology related to this type of polymerization, a number of additional system components will generally be included for a variety of reasons. Included among these are foaming or blowing agents which generate gas during the high-temperature foaming stage to form the cells of the final product. Examples of these agents are ureas, such as thiourea, dimethylurea and unsubstituted urea. Further examples are certain organic acids such as itaconic acid and citric acid, as well as anhydrides of such acids, such as maleic anhydride. The ureas are preferred in view of their similarity in chemical structure to the amides.

Further additives are solvents and supplemental foaming aids. Examples include water, formamide, dimethylformamide and formic acid.

Still further additives are comonomers which are included in the composition to enter into the polymerization process with the principal monomers and the acrylamide. These comonomers serve to add strength and/or water resistance to the final product. Examples are vinyl or vinylidene compounds, including styrenes, lower alkyl esters of acrylic or methacrylic acid, vinyl esters, and vinyl chloride. Among the styrenes are methylstyrenes and unsubstituted styrenes.

Some of these agents will also serve to suppress premature precipitation if included in sufficient amounts. Urea, water and styrene in particular, and foaming aids and agents in general have this effect. In general, however, when these additives are relied on for this effect, relatively large amounts are needed, and the result is excessive expansion during the foaming stage. This causes weaknesses in the product and ultimately rupture. One distinct advantage of the inclusion of acrylamide in accordance with the present invention is that it lessens the needed amounts of these additives and inhibits precipitation without giving rise to excessive foaming.

Preferred formulations in accordance with the invention will include water and urea, and preferably water, urea and formamide. The combination of these latter additives and acrylamide will generally be at least about 24 parts by weight per 100 parts by weight of the combination of the two principal monomers. When unsubstituted urea is included. preferred amounts will be from about 1 to about 20 parts by weight, preferably from about 1 to about 10 parts by weight. Likewise, when water is included preferred amounts will generally be from about 1 to about 15 parts by weight, preferably from about 3 to about 10 parts by weight. Still further, when styrene is included, preferred amounts will be from about 2 to about 10 parts by weight. All such figures are based on 100 parts by weight of the combined principal monomers.

Finally, polymerization catalysts or freeradical initiators are included. Examples of such initiators are azo-bis-isobutyronitrile, isobutyryl peroxide, di(2-ethylhexyl) peroxydicarbonate, acetyl cyclohexane sulfonyl peroxide, di(sec-butyl) peroxydicarbonate, diisopropyl peroxydicarbonate, 2,4-dichlorobenzoyl peroxide, t-butyl peroxypivalate, 2,5-dimethyl-2,5-bis(2-ethyl hexanoylperoxy) hexane, acetyl peroxide, succinic acid peroxide; t-butyl peroxyoctoate, benzoyl peroxide, p-chlorobenzoyl peroxide, t-butyl peroxyisobutyrate, t-butyl peroxymaleic acid, bis(1-hydroxycyclohexyl) peroxide, 1-hydroxy-1'-hydroperoxydicyclohexyl peroxide, t-butyl peroxyisopropyl carbonate, 2,5-di-methyl-2,5-bis(benzoylperoxy) hexane, t-butyl peroxyacetate, methyl ethyl ketone peroxides, di-t butyl diperoxyphthalate, t-butyl proxybenzoate, n-butyl 4,4-bis(t-butylperoxy) valerate, 2,5-dimethyl-2,5 -bis(t-butylperoxy) hexane, t-butyl hydroperoxide, 3,5-dimethyl-3,5-dihydroxy 1,2-peroxycyclopentane, di-t-butyl peroxide, 2,5-dimethyl-2,5-bit(t-butylperoxy) hexane-3, and 1,1,3,3-tetramethylbutyl hydroperoxide.

Combinations of low-temperature and high-temperature initiators are frequently preferred. Examples of low-temperature initiators are azo-bis-isobutyronitrile and benzoyl peroxide, whereas an example of a high temperature initiator is t-butylperbenzoate.

The compositions of the present invention may be processed according to conventional techniques generally known and applied in the fabrication of products from the principal monomers. Procedures generally include compounding of the formulation, casting and curing the formulation into a polymerized pre-foam, and finally foaming the pre-foam to form the final product. The polymerization is generally conducted at a temperature ranging from about 40° C. to about 60° C. for a length of time ranging from about 16 to about 96 hours, followed by a temperature of about 80 to about 100° C. for about 1 to about 6 hours. The result is a transparent solid polymer, generally prepared in the form of a sheet, which can be cut to any desired size. The sheet is preferably formed in the horizontal position to facilitate the escape of bubbles. Expansion or foaming is then achieved by placing the sheet in a mold, and heating it to about 150–200° C. for about 1–24 hours to fill the mold.

In certain applications, it is beneficial to include a post-curing step after the foaming is complete, to further cure the foamed material, improve its moisture resistance, and render it more able to withstand high temperatures. The post cure is generally achieved by raising the temperature of the material about 10 to 20° C. (i.e., to about 160–220° C.) for a period of time generally ranging from about 1 to 10 hours. This is particularly desirable when producing products for use in aerospace applications where high operational temperatures are expected.

The final foam product is useful in a variety of ways. A notable example is as a structural material for high performance applications where it is desirable to maintain as light a weight as possible. The foam may be used in composite structures in which a sheet or block of the foam is bonded at its surface to a face sheet, and preferably to two face sheets, one to the surface of each of two opposite sides of the foam core in a sandwich-type arrangement. The materials from which such face sheets are made will vary depending on the application or intended use of the ultimate composite product. Examples are metals, polymers and paper. Aluminum face sheets are particularly preferred. In such composite structures, the foam may serve as a substitute for honeycomb, and the composites may be used as structural panels for aircraft or other light-weight structures.

The following examples are offered for purposes of illustration only, and are intended neither to define nor limit the invention in any manner.

EXAMPLE 1

This example illustrates the properties of compositions within the scope of the invention. Polymerization was carried out at 46° C. for 48 hours. The presence or absence of a precipitate during the polymerization process is indicted in the last column of the table. Although not listed in the table, AIBN (azo- bis-isobutyronitrile) was present in each of the formulations at 0.1 part by weight.

TABLE I

| No. | Meth-acrylic acid | Meth-acrylo-nitrile | Water | Acryl-amide | Urea | Form-amide | Sty-rene | Maleic Anhy-dride | PPT?* |
|---|---|---|---|---|---|---|---|---|---|
| 1 | 66 | 34 | 6 | 9 | 5 | 0 | 3 | 3 | yes |
| 2 | 66 | 34 | 6 | 11 | 5 | 0 | 3 | 3 | yes |
| 3 | 66 | 34 | 6 | 13 | 5 | 0 | 3 | 3 | yes |
| 4 | 66 | 34 | 6 | 15 | 5 | 0 | 3 | 3 | no |
| 5 | 66 | 34 | 6 | 7 | 5 | 2 | 3 | 3 | yes |
| 6 | 66 | 34 | 6 | 9 | 5 | 2 | 3 | 3 | yes |
| 7 | 66 | 34 | 6 | 11 | 5 | 2 | 3 | 3 | no |
| 8 | 66 | 34 | 6 | 13 | 5 | 2 | 3 | 3 | no |
| 9 | 66 | 34 | 6 | 7 | 7 | 0 | 3 | 3 | yes |
| 10 | 66 | 34 | 6 | 9 | 7 | 0 | 3 | 3 | yes |
| 11 | 66 | 34 | 6 | 11 | 7 | 0 | 3 | 3 | no |
| 12 | 66 | 34 | 6 | 13 | 7 | 0 | 3 | 3 | no |
| 13 | 66 | 34 | 6 | 7 | 7 | 2 | 3 | 3 | yes |
| 14 | 66 | 34 | 6 | 9 | 7 | 2 | 3 | 3 | no |
| 15 | 66 | 34 | 6 | 11 | 7 | 2 | 3 | 3 | no |
| 16 | 66 | 34 | 6 | 13 | 7 | 2 | 3 | 3 | no |

*Precipitation observed during polymerization.

The data in this table indicate that acrylamide at certain levels in the particular system used prevents precipitation during the polymerization process.

EXAMPLE 2

As a further example of a formulation within the scope of the invention, the following was prepared (again expressed in parts by weight):

| Methacrylic acid | 69 parts |
|---|---|
| Methacrylonitrile | 31 parts |
| Acrylamide | 15 parts |
| Maleic anhydride | 2 parts |
| Styrene | 4 parts |
| Formamide | 1.5 parts |
| Water | 6 parts |
| Urea | 3 parts |
| AIBN | 0.08 part |
| t-Butyl perbenzoate | 0.1 part |

The mixture was purged with nitrogen and polymerized at 47° C. for 48 hours, followed by 100° C. for 3 hours. The resulting solid polymer was expanded in a closed metal mold at 160° C. for 16 hours followed by 180° C. for 5 hours. This produced a foamed material which was pale yellow in color with a foam density of 7.6 pounds per cubic foot (pcf) (121.8 g/L). The material had a highly uniform cell structure of very fine cells.

EXAMPLE 3

As a further example of a formulation within the scope of the invention, the following mixture (again expressed in parts by weight) was prepared:

| Methacrylic acid | 72 parts |
|---|---|
| Methacrylonitrile | 28 parts |
| Acrylamide | 15 parts |
| Maleic anhydride | 2 parts |
| Styrene | 4 parts |
| Formamide | 2 parts |
| Water | 6 parts |
| Urea | 9 parts |
| AIBN | 0.07 part |
| t-Butyl perbenzoate | 0.1 part |

The mixture was polymerized and expanded in accordance with the procedures described in Example 2 above. The result was a foamed material with a highly uniform structure of very fine cells and a foam density of 3.4 pcf (54.5 g/L).

EXAMPLE 4

A still further example of a formulation within the scope of the invention was run by preparing the following mixture;

| Methacrylic acid | 70 parts |
|---|---|
| Methacrylonitrile | 30 parts |
| Acrylamide | 15 parts |
| Maleic anhydride | 2 parts |
| Styrene | 3 parts |
| Formamide | 2 parts |
| Water | 6 parts |
| Urea | 5 parts |
| AIBN | 0.07 part |
| t-Butyl perbenzoate | 0.1 part |

The mixture was polymerized and expanded in accordance with the procedures described in Example 2 above. The result was a pale yellow foam material with a highly uniform structure of very fire cells, the material having a density of 4.9 pcf (64.1 g/L). The average cell size measured approximately 40 microns in diameter. The material had a compressive strength of about 360 psi, a compressive modulus of about 13.7 ksi (thousands of pounds per square inch), and a glass transition temperature of about 210° C. based on a 20° C./min DSC scanning rate. The foam had 5.5% moisture absorption after 5 days in 98% relative humidity in a humidity chamber maintained at 75° C.

The examples which follow illustrate the problems addressed by the present invention by showing preparations involving compositions outside the scope of the invention.

EXAMPLE 5

This example demonstrates the effect on moisture resistance of varying amounts of acrylamide.

A base formulation was prepared as listed below:

| Methacrylic acid | 70 parts |
|---|---|
| Methacrylonitrile | 30 parts |
| Acrylamide | 15 parts |
| Styrene | 5 parts |
| Maleic anhydride | 2 parts |

-continued

| | | |
|---|---|---|
| Formamide | 2 | parts |
| Water | 7 | parts |
| Urea | 5 | parts |
| AIBN | 0.07 | part |
| t-Butyl perbenzoate | 0.1 | part |

This formulation was distributed equally among a number of small bottles, and additional amounts of acrylamide were added, ranging from 0 to 45 parts by weight based on 100 parts by weight of the total amount of methacrylic acid and methacrylinitrille charged. Each of the resulting mixtures was purged with nitrogen, then polymerized at 50° C. for 20 hours. No evidence of polymer precipitation was observed during the polymerization stage. The resulting solid polymers were expanded and cured at 350° F. for 5 hours.

The moisture resistance of each resulting foam was then determined by immersing the foam for 2 hours in a water bath at 50° C. and then measuring the length of the foam to compare it to its length prior to immersion. The relationship between the concentration of acrylamide used in preparing the foam and its moisture resistance is shown in Table II.

TABLE II

| Percent Acrylamide | Initial Length (cm) | Final Length (cm) |
|---|---|---|
| 15 | 5.8 | 5.7 |
| 30 | 5.7 | 5.3 |
| 45 | 5.7 | 4.5 |
| 60 | 5.5 | 3.6 |

Comparison of the final length to the initial length in these tests shows the shrinkage ranging from essentially none (at 15% acrylamide) to severe (at 60% acrylamide), the moisture resistance decreasing as the amount of acrylamide in the formulation increases.

EXAMPLE 6

This example illustrates the polymerization of a composition outside the scope of the present invention.

A reaction bottle was charged with the following (in parts by weight):

| | | |
|---|---|---|
| Methacrylic acid | 58 | parts |
| Methacrylonitrile | 42 | parts |
| Urea | 10 | parts |
| Water | 2.7 | parts |
| Benzoyl peroxide | 0.19 | part |
| Dimethylaniline | 5 | drops |

The reaction bottle was purged with nitrogen and polymerized at room temperature. An opaque layer was observed at the bottom (indicating precipitation) after 4 hours.

The reaction mixture was then permitted to polymerize further. Within 23 hours, a solid polymer had formed, which upon observation was revealed to have a fibrous structure.

EXAMPLE 7

This example offers still further illustrations of compositions outside the scope of the invention.

The following formulations (with components listed in parts by weight) were prepared:

TABLE III

| No. | Methacrylic Acid | Methacrylo-Nitrile | Dimethyl-urea | Water | AIBN |
|---|---|---|---|---|---|
| 17 | 70 | 30 | 15 | 10 | 0.1 |
| 18 | 70 | 30 | 15 | 5 | 0.1 |
| 19 | 66 | 34 | 15 | 10 | 0.1 |
| 20 | 66 | 34 | 15 | 5 | 0.1 |

Each formulation was polymerized at 50° C. for 16 hours, followed by 70° C. for 4 hours and 80° C. for 3 hours. All formulations except formulation No. 19 showed premature precipitation during the polymerization process. The foam material resulting from formulation No. 19, however, upon expansion at 170° C. for one hour had a large cell size and nonuniform expansion. Formulations 17, 18 and 20 upon expansion under the same conditions exhibited even larger and less uniform cells upon expansion.

EXAMPLE 8

This example offers still further illustrations of compositions outside the scope of the invention.

The following formulations (with components listed in parts by weight) were prepared:

TABLE IV

| No. | Methacrylic Acid | Methacrylo-nitrile | Water | Urea | Styrene | AIBN |
|---|---|---|---|---|---|---|
| 21 | 66 | 34 | 10 | 10 | 2.4 | 0.1 |
| 22 | 66 | 34 | 10 | 10 | 3.6 | 0.1 |
| 23 | 66 | 34 | 10 | 10 | 4.8 | 0.1 |
| 24 | 66 | 34 | 10 | 10 | 6.0 | 0.1 |

These formulations were polymerized at 50° C. for 24 hours followed by 60° C. for 16 hours. Formulation No. 21 appeared cloudy (an indication of precipitation) after 15 minutes, and No. 22 did likewise after 3 hours. While Nos. 23 and 24 did not turn cloudy during the polymerization process, all four formulations displayed excessive expansion and rupture upon foaming.

EXAMPLE 9

As still further examples of compositions outside the scope of the present invention, the following formulations (with components listed in parts by weight) were prepared and polymerized at 47° C.:

TABLE V

| No. | Methacrylic Acid | Methacrylo-nitrile | Water | Urea | α-Methyl Styrene | AIBN |
|---|---|---|---|---|---|---|
| 25 | 66 | 34 | 10 | 10 | 3.0 | 0.1 |
| 26 | 66 | 34 | 10 | 10 | 3.4 | 0.1 |
| 27 | 66 | 34 | 10 | 10 | 3.8 | 0.1 |
| 28 | 66 | 34 | 10 | 10 | 4.2 | 0.1 |
| 29 | 66 | 34 | 10 | 10 | 4.5 | 0.1 |
| 30 | 66 | 34 | 5 | 10 | 4.0 | 0.1 |

Formulation No. 25 appeared cloudy after 160 minutes, and No. 26 appeared cloudy (indicating precipitation) after 9.5 hours. Nos. 27, 28, and 29 gave no indication of precipitation during the polymerization process. Precipitation was observed in formulation No. 30 (possibly due to its lower water content), and the foamed polymer produced from No. 30 contained a large amount of fibrous material.

EXAMPLE 10

A still further example outside the scope of the present invention involved a formulation consisting of the following (in parts by weight):

| Methacrylic acid | 60 parts |
|---|---|
| Methacrylonitrile | 40 parts |
| Water | 10 parts |
| Urea | 10 parts |
| AIBN | 0.1 part |

The mixture was purged and polymerized at 52° C. for 48 hours. The resulting polymer had fibrous material on the surface and in the interior. Upon subsequent expansion of the polymer at 170° C., distortion due to the fibrous material was observed.

EXAMPLE 11

As still further examples of compositions outside the scope of the present invention, the following formulations were prepared (in parts by weight):

TABLE VI

| No. | Methacrylic Acid | Methacrylonitrile | Water | Urea | Dimethylurea | AIBN |
|---|---|---|---|---|---|---|
| 31 | 66 | 34 | 10 | 10 | 5 | 0.1 |
| 32 | 66 | 34 | 10 | 10 | 7.5 | 0.1 |
| 33 | 66 | 34 | 10 | 10 | 10 | 0.1 |
| 34 | 66 | 34 | 10 | 10 | 5 | 0.1 |
| 35 | 66 | 34 | 10 | 10 | 7.5 | 0.1 |
| 36 | 66 | 34 | 10 | 10 | 10 | 0.1 |

Each of these mixtures was polymerized at 47° C. for 40 hours and 60° C. for 2 hours. Precipitation was observed in Nos. 31 and 32 during the polymerization process; none was observed in Nos. 33, 34, 35 and 36. All of the samples exhibited very coarse cell structure.

The foregoing is offered primarily for purposes of illustration. It will be readily apparent to those skilled in the art that numerous variations, modifications and further substitutions in the materials and procedures described in this specification may be made without departing from the spirit and scope of the invention.

What is claimed is:
1. A composite structure comprising:
    (a) a foam polymer core formed by the polymerization of the following components:
        1. a member selected from the group consisting of acrylic acid and methacrylic acid,
        2. a member selected from the group consisting of acrylonitrile and methacrylonitrile,
        3. acrylamide in an amount ranging from about 5 to about 20 parts by weight per 100 parts by weight of components (a) and (b) combined, and
        4. at least one member selected from the group consisting of water, a urea and a formamide, such that components (iii) and (iv) combined comprise at least about 24 parts by weight per 100 parts by weight of components (i) and (ii) combined; and
    (b) at least one face sheet bonded to the surface of said foam polymer core.

2. A composite structure in accordance with claim 1 in which said foam polymer core has two opposing, substantially planar surfaces, and said composite structure comprises two said face sheets, one bonded to each of said two surfaces.

3. A composite structure in accordance with claim 2 in which said face sheets are fabricated from a member selected from the group consisting of metal, plastic and paper.

4. A composite structure in accordance with claim 2 in which said acrylamide comprises from about 10 to about 20 parts by weight per 100 parts by weight of components (i) and (ii) combined in said foam polymer core.

5. A composite structure in accordance with claim 2 in which component (iv) includes unsubstituted urea at from about 1 to about 10 parts by weight per 100 parts by weight of components (i) and (ii) combined, and water at from about 3 to about 10 parts by weight per 100 parts by weight of components (i) and (ii) combined.

6. A composite structure in accordance with claim 2 in which said components further comprise from about 2 to about 10 parts by weight of unsubstituted styrene.

7. A composite structure in accordance with claim 3 in which component (i) is methacrylic acid, component (ii) is methacrylonitrile, component (iii) is used in an amount ranging from about 10 to about 20 parts by weight per 100 parts by weight of components (i) and (ii) combined, and components (iii) and (iv) combined comprise at least about 24 parts by weight per 100 parts by weight of methacrylic acid and methacrylonitrile combined, and said components further include from about 2 to about 10 parts by weight of styrene per 100 parts by weight of methacrylic acid and methacrylonitrile combined.

* * * * *